United States Patent
Dong et al.

(10) Patent No.: US 11,475,853 B2
(45) Date of Patent: Oct. 18, 2022

(54) DISPLAY MODULE, DISPLAY SYSTEM AND CONTROL METHOD FOR DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chang Dong, Beijing (CN); Rui Han, Beijing (CN); Dong Cui, Beijing (CN); Zhipeng Zhang, Beijing (CN); Wenyang Li, Beijing (CN); Yue Zhai, Beijing (CN); Shouyang Leng, Beijing (CN); Fengping Wang, Beijing (CN); Weining Chi, Beijing (CN); Rui Tan, Beijing (CN); Binxin Song, Beijing (CN)

(73) Assignees: BEIJING BOE OPTOELECTRONICS TECHNOLOGY CO., LTD., Beijing (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/547,030

(22) Filed: Dec. 9, 2021

(65) Prior Publication Data
US 2022/0254313 A1 Aug. 11, 2022

(30) Foreign Application Priority Data
Feb. 5, 2021 (CN) .......................... 202110162433.7

(51) Int. Cl.
*G09G 3/34* (2006.01)
*G09G 5/10* (2006.01)

(52) U.S. Cl.
CPC ............. *G09G 3/3406* (2013.01); *G09G 5/10* (2013.01); *G09G 2300/026* (2013.01);
(Continued)

(58) Field of Classification Search
CPC .. G09G 3/3406; G09G 5/10; G09G 2360/141; G09G 2360/144; G09G 2380/10; G09G 2300/026
See application file for complete search history.

(56) References Cited

U.S. PATENT DOCUMENTS 9,638,905 B1 5/2017 Dai et al.
2011/0188981 A1* 8/2011 Bonn .................... G09F 9/3026
254/133 R
(Continued)

FOREIGN PATENT DOCUMENTS

CN 101685217 A 3/2010
CN 105788464 A 7/2016
(Continued)

*Primary Examiner* — Antonio Xavier
(74) *Attorney, Agent, or Firm* — McCoy Russell LLP (57) ABSTRACT

A display module, a display system, a control method for the display system are provided. The display module includes: a backlight module including an optical film; two display panels on a light exiting side of the optical film, where the two display panels are adjacent to each other and are spliced, orthographic projections of the two display panels onto a plane where the optical film is located are within the optical film, and the orthographic projections of the two display panels onto the plane where the optical film is located do not overlap; and a transparent cover plate on light exiting sides of the display panels, where an ink layer is arranged on a side of the transparent cover plate facing the backlight module, and the ink layer covers a region between two adjacent display panels.

18 Claims, 5 Drawing Sheets

(52) U.S. Cl.
CPC . *G09G 2360/141* (2013.01); *G09G 2360/144* (2013.01); *G09G 2380/10* (2013.01)

(56) References Cited

U.S. PATENT DOCUMENTS

| | | | |
|---|---|---|---|
| 2011/0285607 A1* | 11/2011 | Kim | G06F 1/1616 345/1.3 |
| 2016/0062163 A1* | 3/2016 | Lee | G02F 1/133553 359/850 |
| 2017/0329567 A1* | 11/2017 | Choi | G06F 3/1423 |
| 2018/0052312 A1* | 2/2018 | Jia | G02F 1/13336 |
| 2019/0114961 A1* | 4/2019 | Chang | H01L 27/3293 |
| 2020/0106288 A1* | 4/2020 | Tong | H02J 50/40 |
| 2022/0036776 A1* | 2/2022 | Chao | H01L 27/142 |

FOREIGN PATENT DOCUMENTS

| | | |
|---|---|---|
| CN | 105938686 A | 9/2016 |
| CN | 209343699 U | 9/2019 |
| CN | 111128051 A | 5/2020 |
| CN | 111369900 A | 7/2020 |

\* cited by examiner

FIG. 11

DISPLAY MODULE, DISPLAY SYSTEM AND CONTROL METHOD FOR DISPLAY SYSTEM

CROSS-REFERENCE TO RELATED APPLICATION

The present application claims priority to Chinese Patent Application No. 202110162433.7 filed on Feb. 5, 2021. The entire contents of the above-listed application is hereby incorporated in by reference for all purposes.

TECHNICAL FIELD

The present disclosure relates to the field of display technology, and in particular to a display module, a display system, and a control method for a display system.

BACKGROUND

With the development of display technology, in order to meet usage needs of different users, a vehicle may use a display panel to display instrument information, central control information, and multimedia information, etc.

SUMMARY

In a first aspect, embodiments of the present disclosure provide a display module, including:

a backlight module, where the backlight module includes an optical film;

two display panels on a light exiting side of the optical film, where the two display panels are adjacent to each other and are spliced, orthographic projections of the two display panels onto a plane where the optical film is located are within the optical film, and the orthographic projections of the two display panels onto the plane where the optical film is located do not overlap; and a transparent cover plate on light exiting sides of the display panels, where an ink layer is on a side of the transparent cover plate facing the backlight module, and the ink layer covers a region between the two adjacent display panels.

In some embodiments, a distance between the two display panels ranges from 1 millimeter to 2 millimeters, and a distance between display regions of the two display panels ranges from 4 millimeters to 6 millimeters.

In some embodiments, the backlight module includes two independent groups of light emitting units, the two groups of light emitting units are arranged to correspond to the same optical film, and the two groups of light emitting units correspond to the two display panels respectively.

In some embodiments, a filling structure is further arranged, the filling structure is between the backlight module and the transparent cover, and the filling structure fills a gap between the two display panels.

In some embodiments, the filling structure has a size ranging from 1 millimeter to 2 millimeters in a width direction of the gap.

In some embodiments, the ink layer is between the filling structure and the transparent cover plate, and a part of a first orthographic projection of the ink layer onto the transparent cover plate is between second orthographic projections of display regions of the two display panels onto the transparent cover plate, and the first orthographic projection and the second orthographic projections do not overlap.

In some embodiments, a size of a part of the ink layer that is between the display regions of the two display panels ranges from 4 millimeters to 6 millimeters in the width direction of the gap.

In some embodiments, a polarizer on the light exiting side of the display panel is further arranged, and a third orthographic projection of the polarizer onto the display panel exceeds the display region.

In some embodiments, a distance between a boundary of the third orthographic projection and a boundary of the display region ranges from 0.5 millimeters to 1.5 millimeters.

In a second aspect, embodiments of the present disclosure provide a display system, including the display module according to any of the first aspect; the display panel has the display region and a non-display region surrounding the display region; the display panel includes a substrate, multiple pixel units on the substrate and in the display region, and each of the multiple pixel units includes a pixel circuit; the display module further includes a light detection circuit on the substrate and in the non-display region; the light detection circuit is configured to detect ambient brightness.

In some embodiments, a minimum width between a region where the light detection circuit is located and the display region ranges from 0.7 millimeters to 1.0 millimeters.

In some embodiments, the light detection circuit includes multiple light detection sub-circuits, the light detection sub-circuit includes a photosensitive thin film transistor, and a fourth orthographic projection of the photosensitive thin film transistor onto the transparent cover plate and the first orthographic projection of the ink layer onto the transparent cover plate do not overlap.

In some embodiments, a minimum distance between an edge of the fourth orthographic projection and an edge of the first orthographic projection ranges from 0.1 millimeters to 0.3 millimeters.

In some embodiments, the light detection sub-circuit includes: a voltage dividing resistor, a diode, and a storage capacitor;

a control electrode of the photosensitive thin film transistor is connected to a first terminal of the voltage dividing resistor and a first electrode of the diode, a first electrode of the photosensitive thin film transistor is connected to a data line, and a second electrode of the photosensitive thin film transistor is connected to a current output terminal;

a second terminal of the voltage dividing resistor is connected to a first terminal of the storage capacitor;

where a second electrode of the diode is connected to the first terminal of the storage capacitor;

a second terminal of the storage capacitor is connected to a scan line.

In some embodiments, the light detection sub-circuit further includes a reference thin film transistor, and an orthographic projection of the reference thin film transistor onto the transparent cover plate is within the first orthographic projection.

In some embodiments, the quantity of the reference thin film transistor is more than one, and the more than one reference thin film transistors are connected in parallel.

In some embodiments, the quantity of the photosensitive thin film transistor is more than one, and the more than one photosensitive thin film transistors are connected in parallel.

In a third aspect, embodiments of the present disclosure provide a method for controlling a display system, which is applied to the display system according to any of the second aspect, including:

receiving an ambient brightness signal generated by the light detection circuit according to ambient brightness;

determining the ambient brightness of the display module according to the ambient brightness signal; and controlling display brightness of the display system according to the ambient brightness and a change rate of the ambient brightness.

In some embodiments, each of the display panels includes one or more display sub-regions, and before the receiving the ambient brightness signal generated by the light detection circuit according to the ambient brightness, the control method further includes:

obtaining images to be displayed that correspond to the two display panels;

merging the images to be displayed into a first image;

segmenting the first image into multiple second images, where each of the multiple second images corresponds to one of the display sub-regions; and controlling each of the display sub-regions to display the corresponding second image.

BRIEF DESCRIPTION OF THE DRAWINGS

In order to explain the technical solutions of the embodiments of the present disclosure more clearly, the drawings used in the descriptions of the embodiments of the present disclosure will be briefly introduced hereinafter. Apparently, the drawings in the following descriptions are only some embodiments of the present disclosure. For those of ordinary skill in the art, other drawings can be obtained based on these drawings without any creative efforts.

DETAILED DESCRIPTION

The technical solutions in the embodiments of the present disclosure will be clearly and completely described hereinafter with reference to the drawings of the embodiments of the present disclosure. Apparently, the described embodiments are only a part rather than all of the embodiments of the present disclosure. Based on the embodiments in the present disclosure, all other embodiments obtained by a person of ordinary skill in the art without any creative efforts fall within the protection scope of the present disclosure.

In the related technologies, multiple display panels may be provided on a vehicle to display instrument information, central control information, multimedia information, etc., and distances between the multiple display panels are relatively large, resulting in a reduction in the effective use area.

In view of the above, the embodiments of the present disclosure provide a display module, a display system, and a control method for a display system.

Some embodiments of the present disclosure provide a display module.

Figure 1:
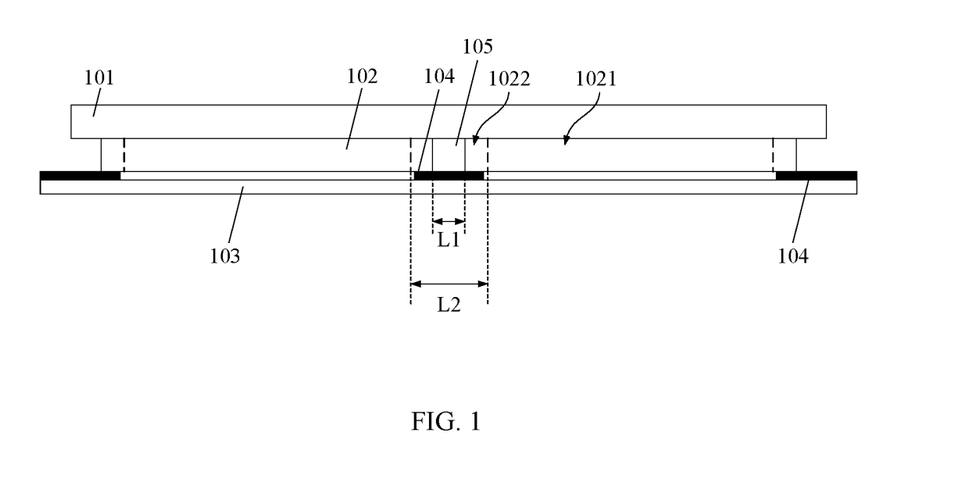
FIG. 1 is a schematic structural diagram of a display module provided by some embodiments of the present disclosure

As shown in FIG. 1, the display module of the embodiments includes a backlight module 101, a display panel 102 and a transparent cover plate 103 which are stacked in sequence.

In the technical solution of the embodiments, the number of display panels 102 is two, and the two display panels 102 are adjacent to each other and are spliced. The backlight module 101 includes an optical film, orthographic projections of the two display panels 102 onto a plane where the optical film is located are within the optical film, and the orthographic projections of the two display panels 102 onto the plane where the optical film is located do not overlap. It should be noted that the present disclosure is described by taking the display module including two display panels as an example, but the present disclosure is not limited to this. In specific implementations, the number of display panels may be more than two.

It can be understood that the two display panels 102 share the transparent cover plate 103 and the backlight module 101, the two display panels correspond to the same optical film, and the two display panels 102 may be configured to display different images. That is, except for sharing the transparent cover plate 103 and the backlight module 101, other structures and functions of the display panels 102 may be independent of each other.

Reference is made to FIG. 1. In the embodiments, a distance between the two display panels 102 may be 1 to 2 millimeters, and a distance between display regions 1021 of the two display panels 102 may be 4 to 6 millimeters. In some embodiments, the distance between the two display panels 102 is 1.5 millimeters, and the distance between the display regions 1021 of the two display panels 102 is not greater than 5.5 millimeters.

As shown in FIG. 1, in the embodiments, the display panel 102 has the display region 1021 and a non-display region 1022 surrounding the display region 1021. The dashed line in FIG. 1 exemplifies a boundary between the display region 1021 and non-display region 1022.

The distance between the display region 1021 of each display panel 102 and the edge of the display panel 102 may be controlled to be about 2 mm. The two display panels 102 use the same backlight module 101, and the two display panels 102 correspond to the same optical film. Moreover, each of the orthographic projections of the two display panels 102 onto the plane where the optical film is located is within the optical film, and the orthographic projections of different display panels 102 onto the plane where the optical film is located do not overlap.

Further, the two display panels 102 use the same transparent cover plate 103, an ink layer 104 is provided on the transparent cover plate 103, and the ink layer 104 covers a region between two adjacent display panels 102.

It should be understood that the gap between the display panel 102 and the transparent cover plate 103 in FIG. 1 is only drawn to exemplarily indicate a position of the ink layer 104, and the display panel 102 and the transparent cover plate 103 needs to be attached to each other.

In the technical solution of the embodiments, the two display panels 102 share the same optical film and the same transparent cover plate 103, which reduces space occupied by structures such as fixing structures required by the backlight module 101 and supporting structures required by the backlight module 101 or the transparent cover plate 103. Therefore, the distance between two adjacent display panels 102 can be reduced, the waste of space can be reduced, and the space utilization rate can be improved.

As shown in FIG. 1, in order to adapt to the assembly error between the display panel 102 and the transparent cover plate 103 and the space required by the assembly process, the distance L1 between two adjacent display panels 102 is controlled to be not greater than 1.5 mm in the embodiments, which may control the distance L2 between the display regions 1021 of the two adjacent display panels 102 to be not greater than 5.5 mm.

In some embodiments, the distance L1 between the two adjacent display panels 102 is controlled to be 1 mm. In this way, the distance L2 between the display regions 1021 of the two adjacent display panels 102 may be controlled to be 5 mm, which effectively reduces the distance between the display regions 1021 of the display panels 102. As a result, a narrow frame is achieved, which is conducive to improve the visual effect and user experience.

The display module applied to a vehicle-mounted display of a vehicle is taken as an example. The display panel 102 may be used as a liquid crystal instrument panel on the vehicle to replace the conventional mechanical instrument to display relevant instrument information such as vehicle speed and mileage. The display panel 102 may be set for the center console to display central control information such as the air conditioner status, the temperature in the vehicle, and multimedia information.

In some embodiments, the two display panels 102 are used to display instrument information of the vehicle and display central control information, respectively. Further, in some embodiments, a refresh frequency of the display panel 102 for displaying instrument information is less than a refresh frequency of the display panel 102 for displaying central control information.

It should be understood that most of the instrument information displayed on the first display panel as the liquid crystal instrument panel may be backgrounds, such as a vehicle speed scale, an engine speed scale, and so on. These backgrounds are fixed, and the content that may change is relatively small, while the content of the central control information has a relatively large change. Therefore, the refresh frequency of the display panel 102 that controls and displays instrument information is relatively small, which may not affect the actual display effect.

In this way, in the embodiments, the refresh frequencies of the two display panels are controlled to be different, which can reduce the power consumption of the display panels and prolong the service life.

In some of the embodiments, the backlight module 101 includes two independent groups of light emitting units, and the two groups of light emitting units correspond to the two display panels 102 respectively. In the embodiments, by arranging two groups of light emitting units corresponding to the display panels 102, the brightness of each of the two display panels 102 may be adjusted individually, which facilitates reducing the energy consumption and improving the display effect.

In some embodiments, a filling structure 105 is between the backlight module 101 and the transparent cover plate 103, and the filling structure 105 is used to fill the gap between the two display panels 102. The filling structure has a size ranging from 1 to 2 millimeters in a width direction of the gap.

As shown in FIG. 1, the filling structure fills the gap between two display panels. Therefore, along the width direction of the gap, the size of the filling structure 105 may be equal to the distance L1 between the two adjacent display panels.

It should be understood that the distance between the two adjacent display panels 102 is relatively small, and the setting angles of the two adjacent display panels 102 may be different. Therefore, at a position between the two adjacent display panels 102, the display module may have a certain deformation and have a large stress. The deformation may occur at the edge of the display panel 102, or between the display panel 102 and the transparent cover plate 103. This may cause water, oxygen, etc., to invade and affect reliability of the display module. In addition, gas may invade and form bubbles, and dust may also invade and form obstructions. The above factors may adversely affect the display effect.

In the embodiments, the filling structure 105 is further provided between the two adjacent display panels 102. The filling structure 105 may select a material such as frame sealant that can isolate water, oxygen, dust, etc. By sealing and filling of the region between the two adjacent display panels 102, the possibility of water, oxygen, dust, and other impurities intruding is reduced, which helps to reduce possible adverse effects on the reliability or display effect of the display panel 102.

The ink layer 104 is between the filling structure 105 and the transparent cover plate 103. A part of the first orthographic projection of the ink layer 104 onto the transparent cover plate 103 is between the second orthographic projections of the display region 1021 of the two display panels 102 onto the transparent cover plate 103. The first orthographic projection and the second orthographic projections do not overlap. Along the width direction of the gap, the size of the part of the ink layer 103 between the display regions 1021 of the two display panels 102 is 4 to 6 mm.

It should be understood that the ink layer 104 is mainly used to shield a region of the transparent cover plate 103 outside the part corresponding to the display regions 1021, and the width of the part of the ink layer 104 between the two display substrates needs to be smaller than the distance L2 between the display regions 1021 of the two display panels 102, to avoid affecting the display effect.

In some embodiments, the display module further includes a polarizer on the light exiting side of the display panel 102, a third orthographic projection of the polarizer onto the display panel 102 exceeds the display region 1021, and the shortest distance between a boundary of the third orthographic projection and a boundary of the display region 1021 is greater than 1 millimeter.

In order to avoid affecting the display effect, the size of the polarizer needs to be larger than the size of the display region 1021. Generally, the size of the polarizer may exceed the display region 1021 by about 1 mm. It should be understood that temperature change and other factors may cause the size of the polarizer to change and further cause light leakage of the display panel 102. In the embodiments, by controlling the third orthographic projection of the polarizer onto the display panel 102 to exceed the display region 1021, the possibility of light leakage caused due to the size change of the polarizer can be reduced.

In the above embodiments of the present disclosure, the display module applied to the vehicle-mounted display is taken as an example for description, but the present disclosure is not limited to this. It can be understood that the solution of the present disclosure may be applied to other scenarios where spliced display panels are used.

The two display panels of the display module provided by the embodiments of the present disclosure share the same optical film and the same transparent cover plate, the two display panels are spliced adjacently, the distance between the two display panels is 1 to 2 mm, and the distance between the display regions of the panels is 4 to 6 mm. In this way, the technical solutions of the embodiments of the present disclosure reduce the space occupied by supporting structures or fixing structures for edges of the backlight module and the transparent cover plate, which can reduce the distance between different display panels, reduce the waste of space, and help improve the space utilization rate.

The present disclosure also provides a display system including any of the above display module.

The display panel 102 in the display module has the display region 1021 and a non-display region 1022 surrounding the display region 1021.

The display panel includes a substrate, and multiple pixel units on the substrate and in the display region. Each pixel unit includes a pixel circuit. Reference may be made to the related technologies to a certain extent for the specific structure of the pixel circuit, which is not further limited herein.

The display module further includes a light detection circuit on the substrate and in the non-display region 1022. The light detection circuit is configured to detect ambient brightness. A minimum width between the region where the light detection circuit is located and the display region 1021 is 0.7 mm to 1.0 mm.

In the embodiments, the light detection circuit is set to detect the ambient brightness, and the display brightness of the display panel 102 is adjusted according to the ambient brightness to improve the degree of adaptability to the environment.

Figure 2:
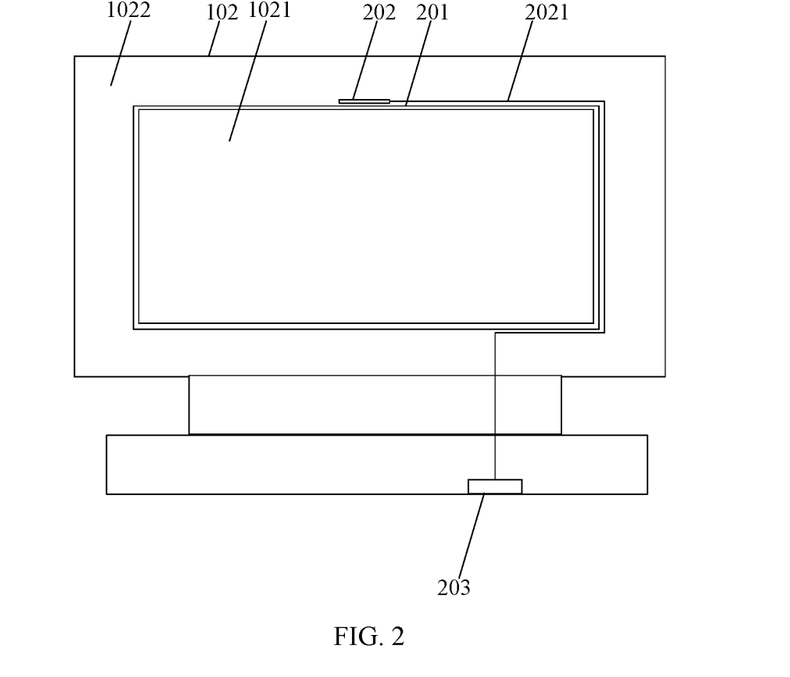
FIG. 2 is another schematic structural diagram of a display module provided by some embodiments of the present disclosure.

As shown in FIG. 2, in some embodiments, the display panel 102 includes an electrostatic ring 201 around the display region 1021 and a control switch for controlling the electrostatic ring 201, and the light detection circuit is on a side of the electrostatic ring 201 away from the display region 1021. In this way, the distance between the region where the light detection circuit is located and the display region 1021 is greater than or equal to the width of the region where the electrostatic ring 201 is located.

In the embodiments, the width of the electrostatic ring 201 is 0.7 mm, which can prevent possible interference of static electricity on the display region 1021 and ensure that the display panel 102 can operate normally. The light detection circuit is on the side of the electrostatic ring 201 far away from the display region 1021, so that the possibility of the light detection circuit and the wiring 2021 connected to the light detection circuit coupling with other structures in the display region 1021 is reduced, thereby facilitating reducing the possible adverse effect on the detection result of the ambient brightness and the display effect.

The light detection circuit includes multiple light detection sub-circuits. The light detection sub-circuit includes a photosensitive thin film transistor 202. A fourth orthographic projection of the photosensitive thin film transistor 202 onto the transparent cover plate 103 and the first orthographic projection of the ink layer 104 onto the transparent cover plate 103 do not overlap, so as to prevent the ink layer 104 from blocking the photosensitive thin film transistor 202. In this way, the photosensitive thin film transistor 202 is exposed to detect ambient brightness. The minimum distance between the edge of the fourth orthographic projection and the edge of the first orthographic projection is 0.1 to 0.3 mm.

In the embodiments, a certain error is reserved for the formation of the ink layer 104 and the assembly of the display panel 102, and the distance between the fourth orthographic projection of the photosensitive thin film transistor 202 onto the transparent cover plate 103 and the edge of the ink layer 104 is further controlled to be 0.1 to 0.3 mm, which reduces the frame width of the display module and improves space utilization and user experience.

It should be understood that the semiconductor layer of a thin film transistor is relatively sensitive to light, and its electrical performance may be affected by light. Therefore, the corresponding light intensity may be determined based on the change of the electrical parameters of the thin film transistor, and the ambient brightness is then determined.

Figure 8:
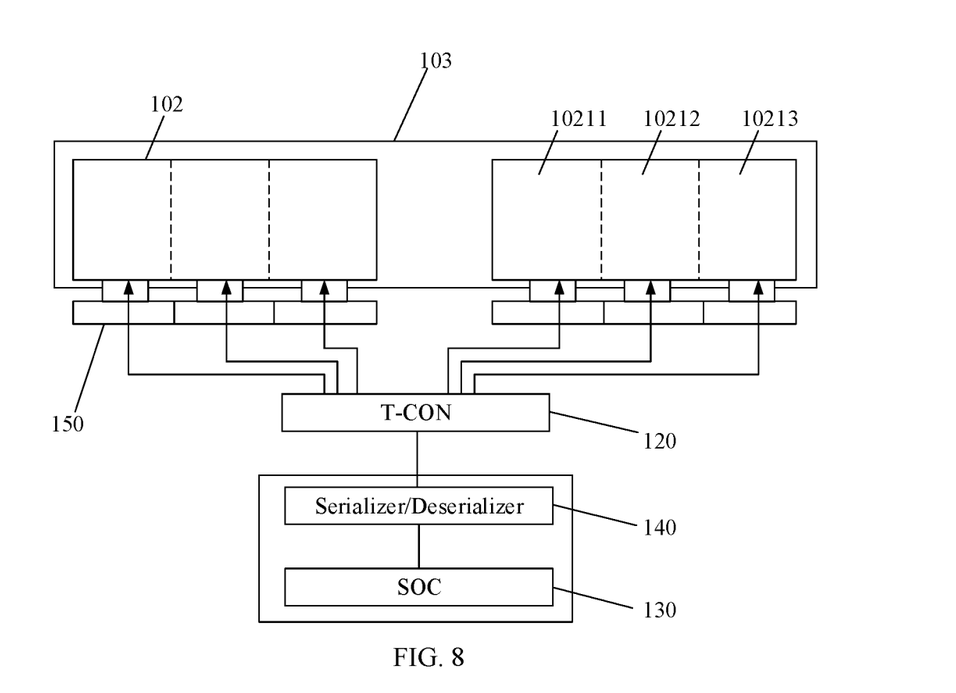
FIG. 8 is another schematic structural diagram of a display system provided by some embodiments of the present disclosure.

Reference is made to FIGS. 2 and 8. In order to avoid interference on the wiring connection of the source driver 150 and other devices, in the embodiments, the photosensitive thin film transistor 202 is arranged on a side of the display panel 102 away from the source driver 150. The wiring of the thin film transistor 202 extend along the edge of the electrostatic ring to the side close to the source driver 150, and continue to extend to the circuit board where the source driver 150 is disposed, so as to output the ambient brightness signal through the output interface 203 on the circuit board. A photosensitive control circuit is connected to the output interface 203 to obtain the ambient brightness signal output by the photosensitive thin film transistor 202.

Figure 3:
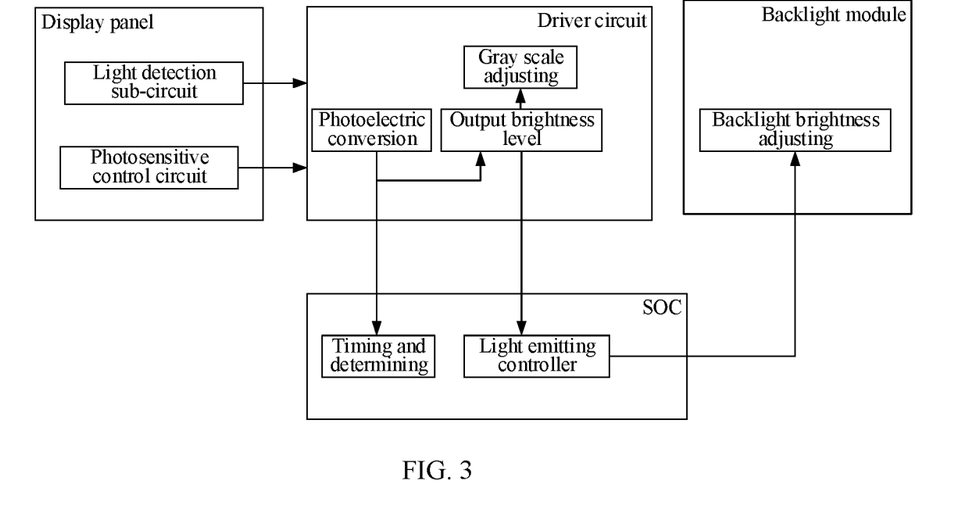
FIG. 3 is a schematic diagram of connection of a display system in some embodiments of the present disclosure.

As shown in FIG. 3, in some embodiments, the light detection circuit includes a light detection sub-circuit and a photosensitive control circuit. The light detection sub-circuit includes a photosensitive thin film transistor 202, and is configured to collect ambient brightness and output an ambient brightness signal based on the ambient brightness, and the photosensitive control circuit is configured to control the output of the ambient brightness signal.

The light detection sub-circuit outputs the ambient brightness signal to the driver circuit (Driver IC) under the control of the photosensitive control circuit. After photoelectric conversion, the brightness level of the collected ambient brightness is outputted. When the brightness needs to be adjusted according to the ambient brightness, the display gray scale may be adjusted, and the backlight brightness of the backlight module 101 may also be adjusted through the light emitting controller at the SOC.

In some embodiments, only the photosensitive thin film transistor 202 is provided to detect the ambient brightness. In other embodiments, a reference thin film transistor may also be provided, an orthographic projection of the reference thin film transistor onto the transparent cover plate 103 is within the first orthographic projection, and the reference thin film transistor is configured to provide a reference signal for ambient brightness detection.

The reference thin film transistor is used as a reference for measuring the ambient brightness. It should be understood that the orthographic projection of the reference thin film transistor onto the transparent cover plate 103 is within the first orthographic projection of the ink layer 104 onto the transparent cover plate 103. In this way, due to the shielding of the ink layer 104, the electrical performance of the reference thin film transistor is negligibly affected by the brightness of the external environment, and the reference thin film transistor is affected by other environmental factors such as temperature. It can be understood that, except for the influence of ambient brightness, other operating conditions of the reference thin film transistor and the photosensitive thin film transistor 202 are the same. With the same other conditions, the main factor causing the differences in the electrical parameters of the reference thin film transistor and the photosensitive thin film transistor 202 is the ambient brightness.

In this way, differences in the electrical parameters of the reference thin film transistor and the photosensitive thin film transistor 202 may be combined to determine the ambient brightness.

Figure 4:
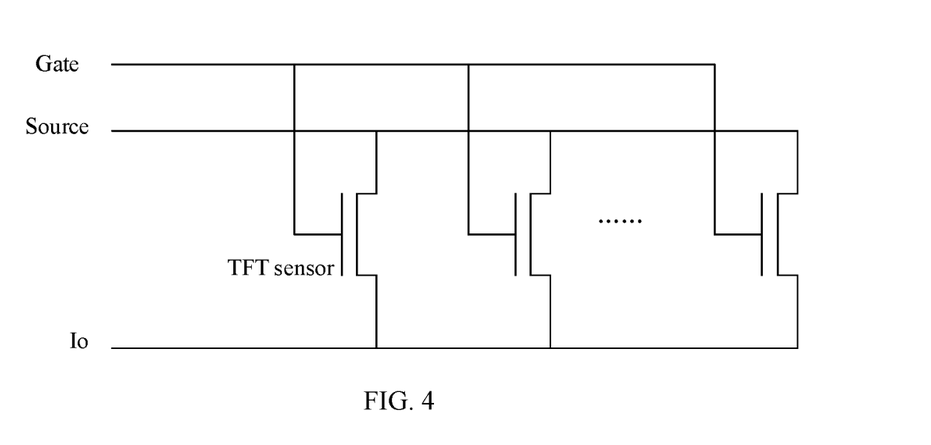
FIG. 4 is a circuit diagram of a light detection sub-circuit in some embodiments of the present disclosure.

Reference is made to FIG. 4. The TFT sensor in FIG. 4 refers to any of the reference thin film transistor or the photosensitive thin film transistor 202, that is, in the embodiments, the photosensitive thin film transistor 202 and the reference thin film transistor have the same connection manner.

In some embodiments, the TFT sensor includes a control terminal, a first terminal, and a second terminal. One of the first terminal and the second terminal may be a source and the other may be a drain. The control terminal of the TFT sensor is connected to a scan line Gate, a control signal provided by the scan line Gate may be a square wave signal, and a gate control signal of the display panel 102 may be reused as the control signal, etc.

The first terminal of the TFT sensor is connected to a data line Source, and the data line Source provides a known reference signal. The second terminal of the TFT sensor is connected to a current output terminal Io, to output an ambient brightness signal.

Reference is made to FIG. 4. During use, the control signal controls the turn-on and turn-off of the TFT sensor. When the TFT sensor is turned on, the reference signal provided by the data line Source may pass through the TFT sensor and may be outputted through the current output terminal Io as an ambient brightness signal. When the ambient brightness changes, the ambient brightness may be determined by obtaining the ambient brightness signal outputted by the current output terminal Io.

In some embodiments, multiple reference thin film transistors are connected in parallel, and/or multiple photosensitive thin film transistors 202 are connected in parallel.

By setting the reference thin film transistors in parallel, the photosensitive thin film transistors 202 in parallel, interference on the measurement result caused by the damage of an individual reference thin film transistor or photosensitive thin film transistor 202 may be prevented.

In some embodiments, the light detection sub-circuit further includes a protection control circuit, the protection control circuit is electrically connected to the TFT sensor, and the protection control circuit is configured to control the sudden change of the brightness signal outputted by the TFT sensor.

When multiple groups of TFT sensors are connected in parallel, a single TFT sensor may be abnormal. The turn-on and turn-off speed of the TFT sensor is slow. In addition, for the TFT sensor, the higher the temperature, the greater the current. When used in special situations such as vehicles, the display module needs to operate in a high temperature environment, for example, generally, the operating environment of the car machine is −30~85° C. Every time the temperature rises by 1° C., β of the TFT sensor increases by 0.5 to 1%, and the current doubles.

After testing, at a room temperature of about 20 degrees Celsius, the operating current of the TFT sensor is about 1 to 10 microamperes. When the temperature rises to about 50 degrees Celsius, the operating current of the TFT sensor may increase to hundreds of microamperes. The longer the TFT sensor stays with the negative temperature coefficient, the greater the possibility of damage to the TFT sensor.

In the embodiments, by adding the protection control circuit, it is conducive to improve the protection effect for the TFT sensor and reduce the possibility of damage.

Figure 5:
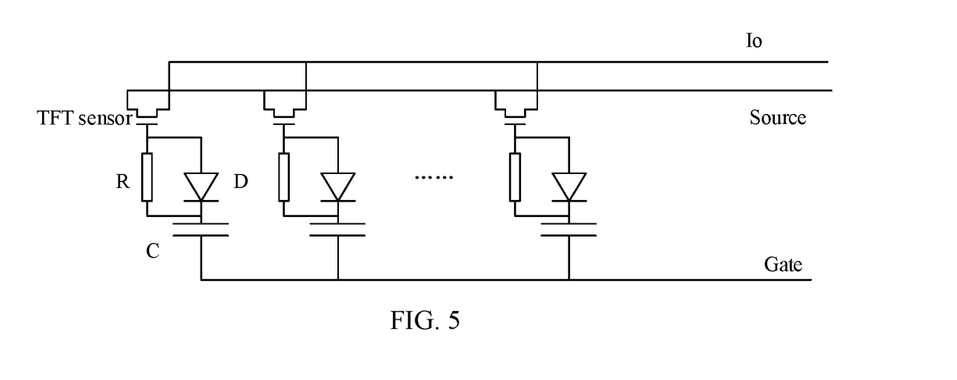
FIG. 5 is a circuit diagram of another light detection sub-circuit in some embodiments of the present disclosure.

As shown in FIG. 5, in some embodiments, the light detection sub-circuit includes the photosensitive thin film transistor 202, a voltage dividing resistor R, a diode D, and a storage capacitor C. The control electrode of the photosensitive thin film transistor 202 is connected to the first terminal of the voltage dividing resistor R and the first electrode of the diode D, the first electrode of the photosensitive thin film transistor 202 is connected to the data line Source, the second electrode of the photosensitive thin film transistor 202 is connected to the current output terminal Io. The second terminal of the voltage dividing resistor R is connected to the first terminal of the storage capacitor C, the second terminal of the diode D is connected to the first terminal of the storage capacitor C, and the second terminal of the storage capacitor C is connected to the scan line Gate to obtain a reference signal.

When the control terminal of the TFT sensor is at a high level, the TFT sensor is turned on instantly, and the voltage of the storage capacitor C remains unchanged; when it is at a low level, the storage capacitor C maintains the voltage, and the TFT sensor quickly enters the cut-off region, speeding up the turn-on and turn-off.

In some embodiments, the turn-on voltage drop of the TFT sensor is about 0.7V, and a diode D with a turn-on voltage drop of 0.4V is selected, to limit the collector or drain of the TFT sensor to be at about 0.4V and shorten the storage time of the TFT sensor from the state of saturation to the critical state of zero bias.

In this way, the light detection sub-circuit of the embodiments can cope with current changes at high temperatures by providing the protection control circuit, which facilitates improving the reliability of the TFT sensor under different temperature conditions.

When the display module is applied to special situations such as vehicles, the requirement for the display effect of the display module is relatively low, for example, the requirement for the resolution of the display panel 102 is relatively low.

In the embodiments, the width of each pixel on the display panel 102 is about 0.15 mm. In order to adapt to the electron mobility characteristics and high current driving under high temperature conditions of the vehicle, in the embodiments, the ratio of the width to the length of the TFT sensor is greater than the ratio of the width to the length of the thin film transistor in the display panel 102. In some embodiments, the width of the TFT sensor is controlled to be 10 to 20 microns. For example, in some embodiments, it is 16 microns and is much smaller than the pixel size in the display panel 102, which helps to improve the display effect and reduce the possibility of bright lines occurring in the display panel 102. In the embodiments of the present disclosure, the width and length of the TFT sensor may specifically refer to the width and length of the channel of the TFT sensor.

As shown in FIG. 3, in the embodiments, the light detection circuit may also include a photosensitive control circuit. The photosensitive control circuit is configured to control the time for the light detection sub-circuit to output the ambient brightness signal. It should be understood that the light detection sub-circuit may always output the ambient brightness signal, and the ambient brightness signal with the ambient brightness greater than a preset brightness threshold may not be needed.

In the embodiments, the photosensitive control circuit is set to control the output time of the ambient brightness signal. The photosensitive control circuit is configured to control the light detection sub-circuit not to output the ambient brightness signal when the brightness is greater than the preset brightness threshold, and output the ambient brightness signal only when the brightness is less than the preset brightness threshold, so that the effective ambient brightness signal can be obtained.

Figure 6:
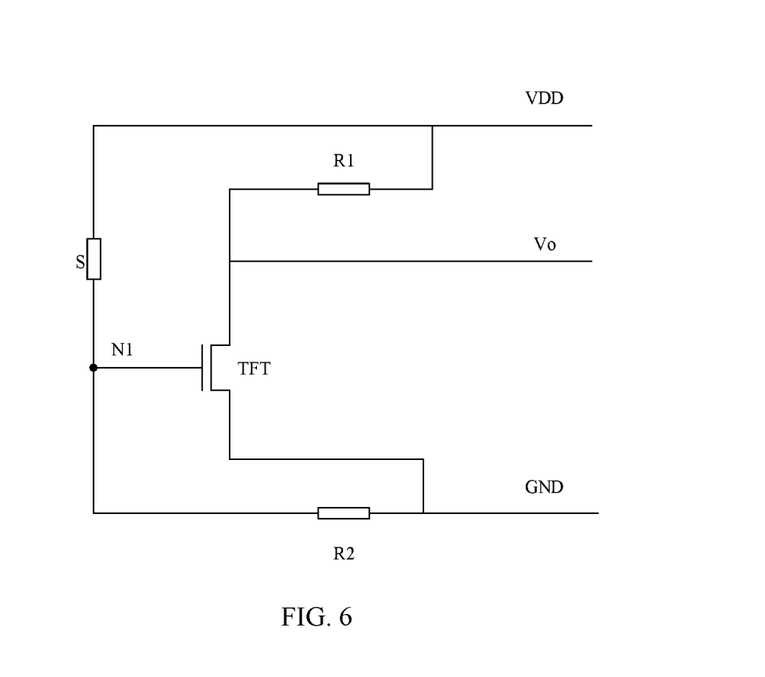
FIG. 6 is a circuit diagram of a photosensitive control circuit in some embodiments of the present disclosure.

As shown in FIG. 6, in the embodiments, the photosensitive control circuit includes a photosensitive element S, a thin film transistor TFT, a first resistor R1 and a second resistor R2. The photosensitive element S and the thin film transistor TFT are arranged at the display panel 102. The photosensitive element S is turned on when the ambient brightness is greater than the above preset brightness threshold, and is turned off when the ambient brightness is less than or equal to the above preset brightness threshold, so as to achieve the transfer of the ambient brightness signal whose corresponding ambient brightness is less than the preset brightness threshold.

As shown in FIG. 6, the first terminal of the photosensitive element S is connected to the power signal line VDD, and the second terminal of the photosensitive element S is connected to the first node N1.

The control terminal of the thin film transistor TFT is connected to the first node N1, the first terminal thereof is connected to the output signal line Vo, and the second terminal thereof is connected to the ground line GND.

The first terminal of the first resistor R1 is connected to the power signal line VDD, and the second terminal thereof is connected to the output signal line Vo.

The first terminal of the second resistor R2 is connected to the first node N1, and the second terminal thereof is connected to the ground GND.

During the detection process, when the brightness of the external environment changes, the semiconductor layer of the thin film transistor may be exposed to light with different intensity, resulting in a change in its electrical parameter. Therefore, the brightness of the external environment may be determined by detecting the electrical parameter of the semiconductor layer of the thin film transistor. In the embodiments, the ambient brightness collected by the photosensitive thin film transistor 202 may be obtained through the photosensitive control circuit. Specifically, ambient brightness signals of the reference thin film transistor and the photosensitive thin film transistor 202 may can be obtained respectively, and comparison is performed to determine the impact of the ambient brightness on the electrical parameter of the photosensitive thin film transistor 202. Then calculation is performed to obtain the ambient brightness, and the luminescence brightness of the backlight module 101 is controlled according to the obtained ambient brightness, so that the display brightness of the display panel 102 can be adjusted according to the ambient brightness.

In the embodiments, the photosensitive thin film transistor 202 may be disposed on any one of the two display panels 102, or the photosensitive thin film transistor 202 may be disposed on each of the display panels 102.

In some embodiments, each of the two display panels 102 is provided with a photosensitive thin film transistor 202, so that the required display panels 102 can be produced through the same production process, and there is no need to set up additional production lines or change the production process to produce different display panels 102, which is beneficial to reduce production cost.

In some embodiments, the structures of the display panels 102 are the same, that is, each display panel 102 includes a corresponding photosensitive thin film transistor 202 and an output interface.

The number of the photosensitive control circuit may be one, and it is connected to only one output interface to obtain the ambient brightness signal, and further controls the display brightness of all the display panels 102 according to the obtained ambient brightness signal.

The photosensitive thin film transistor 202 of the display panel 102 that is not connected to the photosensitive control circuit may be blocked by spraying ink or the like, which may not have a significant impact on the production cost.

A photosensitive thin film transistor 202 of the display panel 102 that is not connected to the photosensitive control circuit may be exposed. When a photosensitive thin film transistor 202 of the display panel 102 that is connected to the photosensitive control circuit fails, it is feasible to switch the photosensitive control circuit to be connected to the corresponding output interface of another display panel 102 with the only need of plugging and unplugging the wirings, and use the photosensitive thin film transistor 202 on the another display panel 102 to detect the ambient brightness, which helps to reduce the maintenance cost.

The number of photosensitive control circuits may be multiple, and they are respectively connected to the output interfaces corresponding to the multiple display panels 102. During the display control process, the photosensitive control circuit corresponding to each display panel 102 may be configured to control the display brightness of the display panel 102. Cross-verification may be performed for the ambient brightness information by comprehensively analyzing the ambient brightness signals obtained by the various photosensitive control circuits, and then the display brightness of each display panel 102 is controlled according to the verification result.

In the embodiments, a timing control circuit may be provided. The timing control circuit may be implemented by a register, and the timing control circuit is configured to detect the brightness change time.

Figure 7:
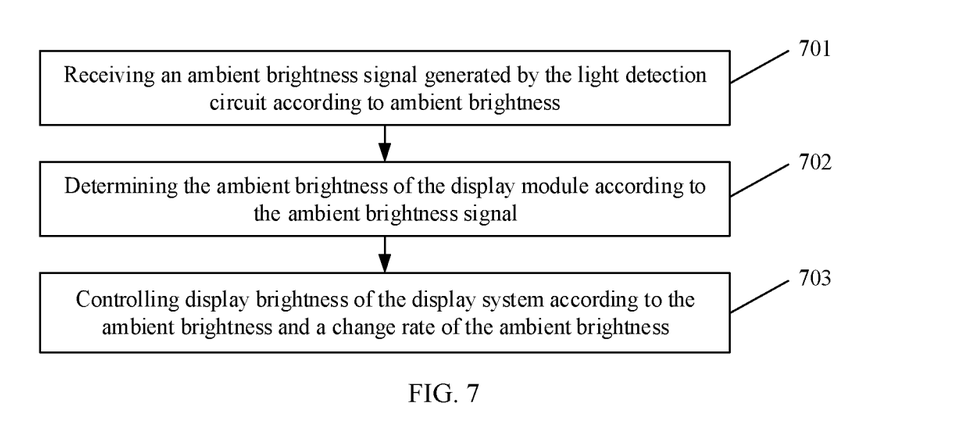
FIG. 7 is a flowchart of a display control method provided by some embodiments of the present disclosure.

The present disclosure also provides a control method for the display system, as shown in FIG. 7, in some embodiments, the method includes:

Step 701: receiving an ambient brightness signal generated by the light detection circuit according to ambient brightness;

Step 702: determining the ambient brightness of the display module according to the ambient brightness signal; and Step 703: controlling display brightness of the display system according to the ambient brightness and a change rate of the ambient brightness.

In the embodiments, the ambient brightness is determined according to the ambient brightness information detected by the light detection circuit, and the display brightness of the display system is then controlled.

In the embodiments, the change speed of the ambient brightness may be determined by detecting the brightness change time. For example, different display brightness control strategies may be further determined. Illustratively, for two situations where brightness levels of the ambient brightness change the same and the change times are different, they may be defined as having different change modes so as to implement different display brightness control strategies.

In some specific implementations, a sudden change in brightness may occur in a short period of time during the driving of the vehicle. For example, when the vehicle passes under a certain bridge, the brightness may be reduced in a short period of time and return to normal. In this case, if the display brightness is adjusted, the display brightness needs to be controlled to recovery later, that is, the display brightness may suddenly change multiple times in a short period of time, which may adversely affect the display effect and user experience. Then the brightness of the display system may be controlled not to change.

In some other embodiments, if the brightness is reduced in a short period of time, the display brightness of the display system may be adjusted quickly to adapt to change in the ambient brightness.

In still other embodiments, the brightness is reduced gradually, the display brightness of the display system may be gradually adjusted, which helps to improve the comfort of the display system, and reduce the influence of the sudden change in display brightness on the usage of the user.

In the embodiments, when the ambient brightness is greater than the preset brightness threshold, the photosensitive element S is turned on, and the VDD voltage provided by the power signal line VDD is output to the N1 node. In this case, the thin film transistor TFT is turned on, and connection between the output signal line Vo and the ground line GND is turned on, and a Vo signal at a low level is outputted.

When the ambient brightness is not greater than the preset brightness threshold, the photosensitive element S is disconnected, the N1 node is at a low level, the thin film transistor TFT is turned off, and the output signal line Vo outputs a Vo signal at a high level.

In the embodiments, registers RT1 and RT2 are further set. Register RT1 is a timer for sudden change in brightness. When there is a sudden change in brightness, register RT1 is started for timing. Register RT2 is a timer for normal brightness. When the brightness is normal and smooth, register RT2 is started for timing.

During implementation, the ambient brightness is collected by the light detection sub-circuit, and the ambient brightness signal is output, and after algorithm processing, it is converted into a circuit signal to determine the light intensity.

Corresponding to different light intensity changes, the time registers RT1 and RT2 are triggered, and determining and timing are performed for each of them.

In some embodiments, multiple levels are defined for brightness, where the brightness step size of each level is 0.1 klux, that is, the brightness level L0 is 0 to 0.1 klux, and the brightness level L1 is 0.1 klux to 0.2 klux . . . and so on. The various brightness levels sequentially correspond to brightness level values pre-stored in the register RL: L0', L1' . . . and so on.

It is set that: T0=5 min, the initial brightness is Lx0=0.05 klux, which is between 0 and 0.1 klux, the corresponding value in the register RL is L0', and the corresponding brightness level is L0.

In the first collection of brightness, the collected brightness is Lx1=0.15 klux, which is corresponding to the brightness level L1, the register RT2 is started, timing is performed for T1, and the subsequent brightness keeps changing continuously.

In some embodiments, the re-detected brightness is Lx2=0.08 klux, which is corresponding to the brightness level L0 and has the same brightness level as the initial brightness, the register RT2 is reset, the timing is cancelled, and no switching is performed.

In some embodiments, the re-detected brightness is Lx3=0.18 klux, which is corresponding to the brightness level L1, and is corresponding to the pre-stored brightness level L1' in the register RL, the timing is performed for T2 by the register RT2, and the duration is $\Delta T$. If $\Delta T > T0$, it means that the new brightness level L1 remains stable, $\Delta T$ is true, $\Delta L$ is true, and the corresponding brightness level L1 is output.

In some embodiments, the re-detected brightness is Lx4=0.24 klux, which is corresponding to the brightness level L2, that is, at the preset brightness level L2'; timing is performed for T2 by RT2 again. In the previous embodiment, the re-detected brightness Lx4 continues to change between 12~13 and the duration $\Delta T > T0$, $\Delta T$ is true, $\Delta L$ is true, then the brightness level L2 is outputted.

In some embodiments, the detected brightness Lx5 continues to change, and there is a momentary brightness jump during the register timing process, which exceeds the range of L1, for example, it may be L4, that is, the register RT2 counts the time $\Delta t$ from L1 in first collection of brightness to L4.

If $\Delta t$ is less than the preset time threshold, such as 1 minute, it means that the brightness change is abrupt, and the register RT1 accumulates the T1 time without reset. Reference may be made to the above process to compare $\Delta T$ and T0.

If $\Delta t$ is greater than the preset time threshold, it means that the ambient brightness change is in a non-abrupt change state, or referred to as a normal and gentle change. The register RT2 resets the timing and it is set that $\Delta T = T1 + \Delta t$. Reference may be made to the above process to compare $\Delta T$ and T0.

As shown in FIG. 8, in some embodiments, the display system further includes a logic board (T-CON, also known as a timing controller) 120 and multiple source drivers 150, and each display panel 102 is connected to one or more source drivers 150, the multiple source drivers 150 are connected to the same logic board 120, and each source driver 150 is independently driven.

It should be understood that, in related technologies, each display panel needs to be provided with independent SOC (System on Chip), logic board, and serializer/deserializer (Serializer/Deserializer) and other accessory devices, and the cost of these accessory devices is relatively high. For the accessory devices of each display panel, a corresponding power supply device needs to be provided. These accessory devices increase the overall cost and increase the power consumption.

It should be noted that an operating environment of a vehicle-mounted device is different from an operating environment of an ordinary device. Generally, vehicles may be exposed to complex environments such as sun exposure and cold. These operating conditions may reduce the power supply capacity of the battery. In addition, the electric energy that a vehicle can provide is limited. When applied to a vehicle, the display system is more sensitive to energy consumption requirements.

As shown in FIG. 8, in the embodiments, only one logic board 120 is provided. Each display panel 102 is connected to one or more source drivers 150, and the multiple source drivers 150 are connected to the same logic board 120. In this way, each display panel 102 is driven by one or more different source drivers 150, the various source drivers 150 are connected to the same logic board 120, and each source driver 150 is independently driven.

As shown in FIG. 8, in the embodiments, the display system includes two display panels 102 and each display panel 102 is connected to three source drivers 150 for exemplary description. The display system also includes a logic board 120 (T-CON), an SOC as a controller 130, a serializer and deserializer 140 for data transmission, and multiple source drivers 150 corresponding to each display panel 102, correspondingly, only one set of power supply device is needed by the logic board 120, the controller 130, etc.

In the related technologies, when displaying an image, one row scan includes a complete row of data during the display control process. Taking a display panel resolution of 1920RGB*720 as an example, each row of the display panel includes 1920 pixels, and each pixel includes three sub-pixels of RGB (red, green, and blue). Therefore, each row actually includes 5760 pieces of display data, and 5760 pieces of row data need to be scanned for data scanning in the display process. In other words, in order to display a complete picture, during the scanning process, all source signal data lines (Source signal lines) need to be scanned from X1 to X5760.

The load of each source driver is definite. Therefore, in the related technologies, each display panel 102 may include multiple source drivers. For example, each source driver corresponds to 1920 pieces of row data, hence, in order to achieve scan of 5760 pieces of row data, three source drivers are needed. The signal series connection between adjacent source drivers is completed by a sync series signal. During the display control process, a complete image needs to be transmitted to each source driver. When the scanning reaches the end of the first source driver, the scan from X1 to X1920 is completed; then, series connection to the second source driver is completed through the sync series signal, and the first row in the second source driver is used as X1921 to continue to scan, and so on, until the complete scan of one row of data is achieved; then scanning is performed for the next row.

In the embodiments, the logic board 120 and the source driver 150 that support end-to-end data stream transmission are selected, and each source driver 150 is independently driven. It can also be understood as the series signal between the source drivers 150 being eliminated. In this way, a set of SOC, T-CON and corresponding power supply component may be used to control the multiple display panels 102, which reduces the cost and power consumption of the device.

The present disclosure also provides a display control method, which is applied to the display system in the embodiments of the present disclosure.

Figure 9:
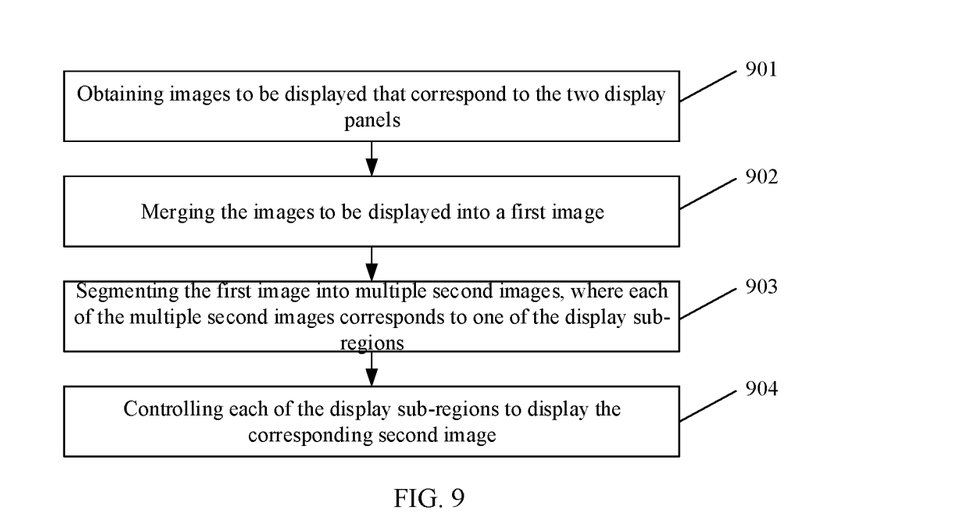
FIG. 9 is another flowchart of a display control method provided by some embodiments of the present disclosure.

As shown in FIG. 9, in some embodiments, the method includes:

Step 901: obtaining images to be displayed that correspond to the two display panels.

In the embodiments, the obtained images to be displayed refer to images to be displayed on the multiple display panels 102 connected to the same logic board 120. Since each logic board 120 is connected to two display panels 102, in the embodiments, two images to be displayed need to be obtained.

Step 902: merging the images to be displayed into a first image.

Figure 10:
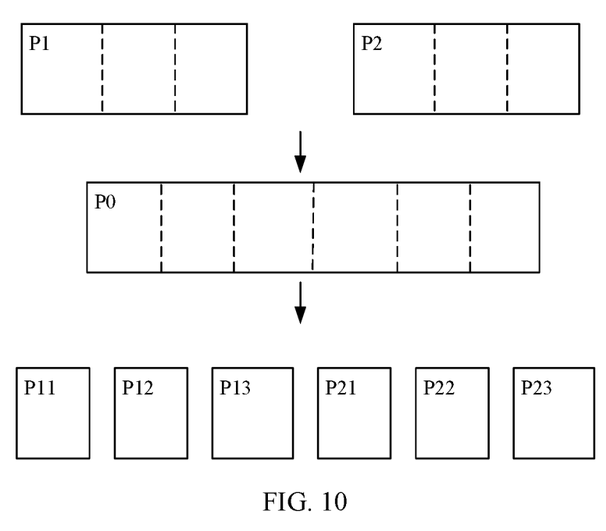
FIG. 10 is a schematic diagram of a processing procedure of an image to be displayed in some embodiments of the present disclosure.

As shown in FIG. 10, taking the display system shown in FIG. 8 as an example, in the embodiments, the number of display panels 102 is two. Therefore, the number of images to be displayed is two. In the embodiments, they are specifically an image P1 to be displayed and an image P2 to be displayed. After the image P1 to be displayed and the image P2 to be displayed are acquired, the image P1 to be displayed and the image P2 to be displayed are merged into a first image P0.

Step 903: segmenting the first image into multiple second images, where each of the multiple second images corresponds to one of the display sub-regions.

As shown in FIG. 8, in the embodiments, the first image P0 may be transferred to the serializer and deserializer 140 through the controller 130 to process the display data, and then the first image P0 is sent to the logic board 120.

In the embodiments, the processing process of the logic board 120 for the first image P0 may include the image processing process in the related technologies. The main difference between the embodiments and the related technologies is that processing on the first image P0 by the logic board 120 includes the segmenting process for the first image P0.

Specifically, the first image P0 is segmented into multiple second images in the logic board 120. In the embodiments, it is specifically segmented into a second image P11, a second image P12, a second image P13, a second image P21, a second image P22, and a second image P23. Each of the above second images may be understood as an image that needs to be displayed in a display sub-region driven by the source driver 150.

In the embodiments, a case where the number of display panels 102 is two, and each display panel 102 includes three source drivers 150 and three display sub-regions 10211, 10212, and 10213 corresponding to the three source drivers 150 is taken as an example for exemplary description.

Each display panel 102 needs to display an image with a resolution of 1920RGB*720, each display panel 102 includes three display sub-regions 10211, 10212, and 10213 respectively driven by three source drivers 150, and the resolution of the first image obtained by merging is 3840 RGB*720. Then, the resolution of each of the six second images obtained by segmenting is 640RGB*720. The six second images obtained by segmenting are respectively sent to the corresponding source drivers 150 through data lines.

Step 904: controlling each of the display sub-regions to display the corresponding second image.

After the display data of the second image obtained by segmenting is transmitted to the corresponding source driver 150 through the corresponding data line by the logic board 120, each source driver 150 drives the corresponding display sub-region to display the image.

The content displayed in the six display sub-regions included in the two display panels 102 are actually six mutually independent image segments, but in terms of visual effects, they are still two complete images of 1920RGB*720.

Since the sync series signal among the source drivers 150 is eliminated in the embodiments, which is different from the serial scanning in the related technologies, in the embodiments parallel scanning is performed for each display sub-region during the display control process. In other words, row scanning is performed for each display sub-region at the same time.

Figure 11:
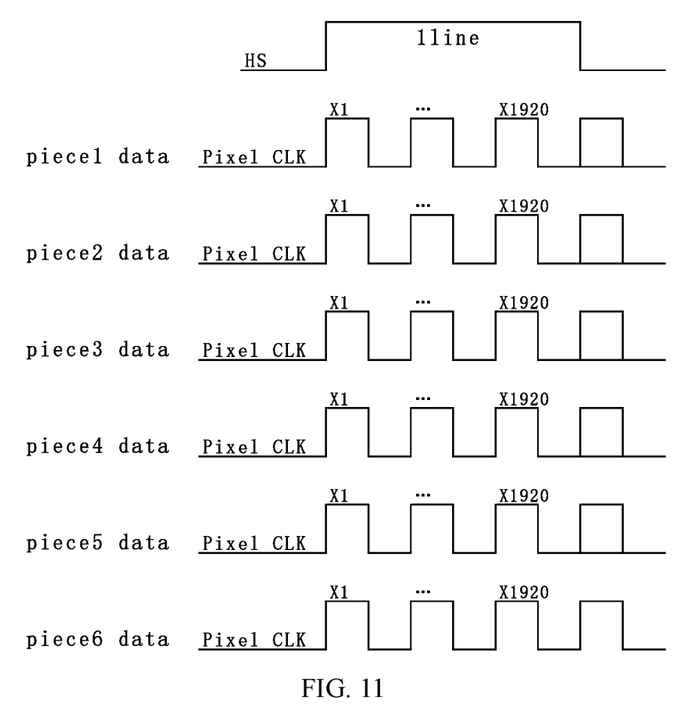
FIG. 11 is a timing diagram of a row data scanning process in some embodiments of the present disclosure.

In the embodiments, the number of the second images is six and only one source driver 150 is used for each display sub-region. As shown in FIG. 11, the HS signal in FIG. 11 represents the scanning timing of a row of data, piece1 data to piece6 data represent the image data of the six second images respectively, and Xn in the Pixel CLK represents the n-th data in a row of data. In the embodiments, the six second images are scanned simultaneously, the row scanning time as needed is shortened to one-sixth of the total time needed for serial scanning, and the remaining five-sixths of the time is used as the splicing time error, in this way, eyes of the user are unable to feel abnormality of the picture within the time range of the row scan, and it is still a complete picture in terms of visual perception.

When the display system is applied to a vehicle, generally, the requirement for the display effect of the display system is relatively low. The technical solutions of the embodiments can reduce the cost and energy consumption of the display system while meeting the requirement for the display effect, which facilitates improving the user experience.

Unless otherwise defined, the technical or scientific terms used in the present disclosure shall have the common meanings understood by those of ordinary skill in the art to which the present disclosure belongs. The terms "first", "second", and the like used in the present disclosure do not indicate any order, quantity, or importance, but are only used to distinguish different components. Word such as "including" or "having" means that the element or item listed before the word covers the element or item listed after the word and the equivalent thereof without excluding other elements or items. Word such as "connected" or "coupled" are not limited to physical or mechanical connection, but may include electrical connection, whether direct or indirect. "Up", "down", "left", "right", etc., are only used to indicate the relative position relationship. When the absolute position of the described object changes, the relative position relationship may change accordingly.

It can be understood that, when an element such as a layer, a film, a region, or a substrate is referred to as being "on" or "under" another element, it may be directly on or under the another element, or, there may be an intermediate element.

The above descriptions illustrate specific implementations of the present disclosure. It should be noted that, for those of ordinary skill in the art, without departing from the principles of the present disclosure, various improvements and modifications can be made. These improvements and modifications shall fall with the protection scope of the present disclosure.

The invention claimed is:

1. A display module, comprising:
    a backlight module, wherein the backlight module comprises an optical film;
    two display panels on a light exiting side of the optical film, wherein the two display panels are adjacent to each other and are spliced, orthographic projections of the two display panels onto a plane where the optical film is located are within the optical film, and the orthographic projections of the two display panels onto the plane where the optical film is located do not overlap; and
    a transparent cover plate on light exiting sides of the display panels, wherein an ink layer is on a side of the transparent cover plate facing the backlight module, and the ink layer covers a region between the two adjacent display panels;
    wherein a distance between the two display panels ranges from 1 millimeter to 2 millimeters, and a distance between display regions of the two display panels ranges from 4 millimeters to 6 millimeters.

2. The display module according to claim 1, wherein the backlight module comprises two independent groups of light emitting units, the two groups of light emitting units are arranged to correspond to the same optical film, and the two groups of light emitting units correspond to the two display panels respectively.

3. The display module according to claim 1, further comprising a filling structure between the backlight module and the transparent cover plate, wherein the filling structure fills a gap between the two display panels.

4. The display module according to claim 3, wherein the filling structure has a size ranging from 1 millimeter to 2 millimeters in a width direction of the gap.

5. The display module according to claim 3, wherein the ink layer is between the filling structure and the transparent cover plate, and a part of a first orthographic projection of the ink layer onto the transparent cover plate is between second orthographic projections of display regions of the two display panels onto the transparent cover plate, and the first orthographic projection and the second orthographic projections do not overlap.

6. The display module according to claim 5, wherein a size of a part of the ink layer that is between the display regions of the two display panels ranges from 4 millimeters to 6 millimeters in the width direction of the gap.

7. The display module according to claim 1, further comprising a polarizer on the light exiting side of the display panel, wherein a third orthographic projection of the polarizer onto the display panel exceeds the display region.

8. The display module of claim 7, wherein a distance between a boundary of the third orthographic projection and a boundary of the display region ranges from 0.5 millimeters to 1.5 millimeters.

9. A display system, comprising the display module according to claim 1;
    wherein the display panel has the display region and a non-display region surrounding the display region;
    wherein the display panel comprises a substrate, a plurality of pixel units on the substrate and in the display region, and each of the plurality of pixel units comprises a pixel circuit;
    wherein the display module further comprises a light detection circuit on the substrate and in the non-display region;
    wherein the light detection circuit is configured to detect ambient brightness.

10. The display system according to claim 9, wherein a minimum width between a region where the light detection circuit is located and the display region ranges from 0.7 millimeters to 1.0 millimeters.

11. The display system according to claim 9, wherein the light detection circuit comprises a plurality of light detection sub-circuits, the light detection sub-circuit comprises a photosensitive thin film transistor, and a fourth orthographic projection of the photosensitive thin film transistor onto the transparent cover plate and the first orthographic projection of the ink layer onto the transparent cover plate do not overlap.

12. The display system according to claim 11, wherein a minimum distance between an edge of the fourth orthographic projection and an edge of the first orthographic projection ranges from 0.1 millimeters to 0.3 millimeters.

13. The display system according to claim 11, wherein the light detection sub-circuit comprises: a voltage dividing resistor, a diode, and a storage capacitor;
    wherein a control electrode of the photosensitive thin film transistor is connected to a first terminal of the voltage dividing resistor and a first electrode of the diode, a first electrode of the photosensitive thin film transistor is connected to a data line, and a second electrode of the photosensitive thin film transistor is connected to a current output terminal;

wherein a second terminal of the voltage dividing resistor is connected to a first terminal of the storage capacitor;

wherein a second electrode of the diode is connected to the first terminal of the storage capacitor;

wherein a second terminal of the storage capacitor is connected to a scan line.

14. The display system according to claim 13, wherein the light detection sub-circuit further comprises a reference thin film transistor, and an orthographic projection of the reference thin film transistor onto the transparent cover plate is within the first orthographic projection.

15. The display system according to claim 14, wherein the quantity of the reference thin film transistor is more than one, and the more than one reference thin film transistors are connected in parallel.

16. The display system according to claim 14, wherein the quantity of the photosensitive thin film transistor is more than one, and the more than one photosensitive thin film transistors are connected in parallel.

17. A control method for a display system, applied to the display system according to claim 9, comprising:

receiving an ambient brightness signal generated by the light detection circuit according to ambient brightness;

determining the ambient brightness of the display module according to the ambient brightness signal; and controlling display brightness of the display system according to the ambient brightness and a change rate of the ambient brightness.

18. The control method according to claim 17, wherein each of the display panels comprises one or more display sub-regions, and before the receiving the ambient brightness signal generated by the light detection circuit according to the ambient brightness, the control method further comprises:

obtaining images to be displayed that correspond to the two display panels;

merging the images to be displayed into a first image;

segmenting the first image into a plurality of second images, wherein each of the plurality of second images corresponds to one of the display sub-regions; and controlling each of the display sub-regions to display the corresponding second image.

\* \* \* \* \*